UNITED STATES PATENT OFFICE 2,089,024

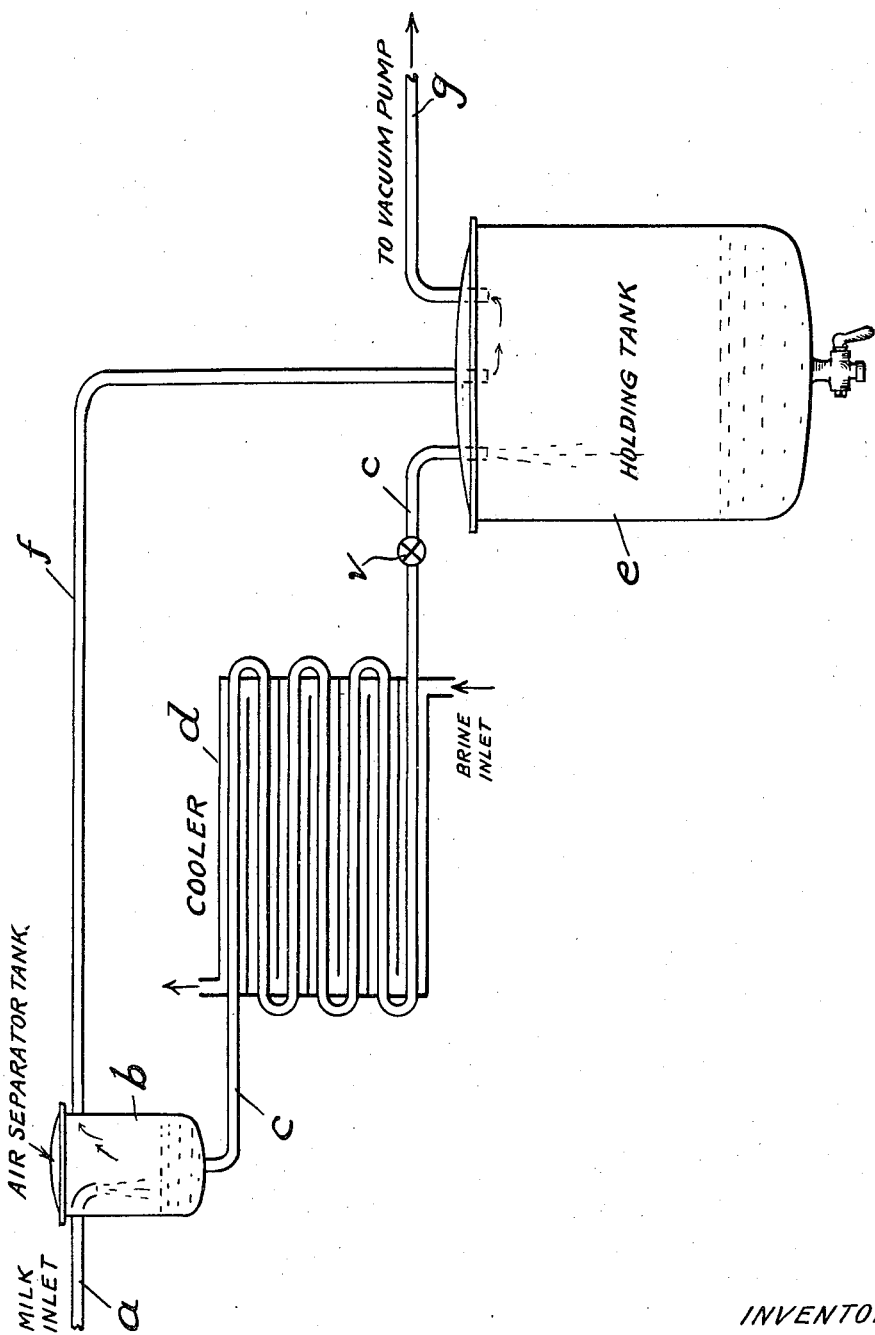

PROCESS FOR COOLING MILK AND APPARATUS USED IN SUCH PROCESS

Cyrus Howard Hapgood, Nutley, N. J., assignor to The De Laval Separator Company, New York, N. Y., a corporation of New Jersey Application May 24, 1932, Serial No. 613,218

4 Claims. (Cl. 99—61)

My invention relates to that type of mechanical milking installations wherein the milk from a number of cows is transferred, through a common milk pipe line, to a common receiver, which is usually under a partial vacuum. Such type of installations may have various specific embodiments and may include the well known releaser system, the so-called "combine" system, of which a patent issued to me February 23, 1932, No. 1,846,805, is an example, and other systems. The invention is particularly applicable to installations of the character of that set forth in said Hapgood patent.

It is desirable to cool the milk in the course of its flow to the receiving tank. This is readily effected by any known type of milk cooler, as, for example, one in which the milk flows in a tortuous stream in heat exchange with an oppositely flowing stream of cold brine.

The expulsion of the milk through the milk pipe line is usually effected by air pressure. It is characteristic of milking machine installations of the kind specified that the rate of flow of milk is variable and may not be continuous, since it is created by the inflow into the milk discharge pipe line of milk from a number of different cows or from milk pails into which the milk from different cows has been previously delivered. Consequently, there are great variations in pressure in the milk outflow line and consequently great variations in the rate of flow of the milk. It is obvious that the extent to which the milk is cooled will vary inversely with the rate of flow.

The object of my invention is to effect a substantially uniform cooling of the milk regardless of variations in the rate of milk flow.

The object is accomplished, in part, by placing, in the milk outflow line, a milk-arresting vessel and by regulating the rate of outflow of the milk from such vessel so that it will approximate the average rate of inflow of milk into such vessel. However, air, as well as milk, enters the milk arresting vessel and this air, as well as the milk, must be cooled, involving waste of refrigeration. Moreover, the air will be trapped in the top of the vessel until all the liquid flows out at which time it will pass through the cooler. The trapped air will exert a varying pressure on the exposed surface of the milk in the vessel thus creating a varying head on the milk flowing through the cooler, which, in turn, will cause a varying rate of flow of the milk.

This particular objection to the use of a milk-arresting vessel may be in part overcome by providing therein an air vent, but considerable milk and milk vapor become entrained with the air and are lost. This objection, however, I have overcome by connecting the air space within the milk-arresting or air-separating vessel, through a shunt circuit, with the milk receiving tank beyond the cooler, so that the air from such separator will be withdrawn through the receiving tank and therein, due to the low temperature and the large air space, will be freed of any milk absorbed in the air and condense and deposit any entrained milk vapor.

A preferred embodiment of the invention is shown in the drawing, which is a side elevation, partly in section, of the milk-deaerating, milk-cooling and milk-holding apparatus embodying my invention.

The milk discharge pipe line $a$ receives milk from any suitable milking apparatus, such, for example, as the apparatus set forth in the aforementioned Hapgood patent. The milk from pipe line $a$ is discharged into a milk-arresting and air-separating vessel $b$. From the bottom of vessel $b$ extends a milk outflow pipe $c$, in which is interposed a cooler $d$, wherein the milk, flowing back and forth through the coils of the cooler, exchanges heat with an oppositely flowing stream of cold brine. The cooled milk discharges into a holding tank $e$, which is of size sufficient to receive and retain the milk from all or a number of the milked cows.

Milk flows through the pipe $a$ into the separator vessel $b$ at an irregular rate and discontinuously. The discharge from the separator vessel $b$ is at such a rate (which may be controlled by the valve $v$) as to maintain, as nearly as possible, a constant and regular flow of milk through the cooler $d$. There is, therefore, most of the time, in the separator vessel $b$ a volume of milk of variable amount. Any air entering the separator $b$ from the milk discharge pipe $a$ is withdrawn through the escape pipe $f$. This pipe extends into the top of tank $e$, from which a pipe $g$ extends to vacuum. Any milk or milk vapor that escapes with the air through pipe $f$ separates from the air after entering tank $e$.

By means of the foregoing improvement, the milk is cooled with uniformity and the highest economy and no appreciable part of the milk is lost.

The described method and apparatus is capable of use for heating milk, for pasteurizing, as well as for cooling milk.

What I claim and desire to protect by Letters Patent is:

1. The process of changing the temperature of milk which, together with air, flows at a variable rate from a source of milk, which comprises arresting the flow of milk and separating air therefrom at its locus of arrest and accumulation; continuously flowing the deaerated milk at a substantially regular rate from the locus of arrest and accumulation while it is flowing thereto at a variable rate; changing the temperature of the milk in the course of its flow from the locus of arrest and accumulation; maintaining a milk seal between the locus of milk arrest and accumulation and air separation and the locus of temperature change to prevent flow of air along with the milk during temperature change; collecting the continuously flowing temperature-changed milk; maintaining a substantial vacuum at the locus of milk collection; withdrawing air and any milk entrained therein from the locus of arrest and accumulation, during said variable inflow to and regular outflow from the source of arrest and accumulation, in a path separate from the path of cooling, to the locus of milk collection and thereat depositing milk vapor, whereby the milk is continuously and uniformly cooled and deaerated without substantial loss of milk vapor.

2. A milking installation for continuously treating milk to effect a uniform change in its temperature while the milk is flowing at a variable rate from a source of supply, which comprises a milk pipe leading from said source of supply, a milk-arresting and air-separating vessel adapted to receive milk from the milk pipe and maintain therein a variable but minimum volume of milk, a temperature changer separate from and independent of said vessel adapted to be sealed by the milk in said vessel from separated air and through which milk from said vessel is adapted to flow while milk is being supplied to the vessel, a milk receiver adapted to receive and hold the milk flowing from the temperature changer, a pipe communicating with said milk receiver and adapted for connection with a source of low pressure, and an air and milk vapor escape pipe connecting said vessel with the milk receiver independent of the temperature changer and otherwise disconnected from said source of low pressure and through which both air and milk vapor are withdrawn to the milk receiver, the milk vapor being there deposited while the air is removed through said low pressure pipe.

3. The process of changing the temperature of milk which, together with air, flows at a variable rate from a source of milk, which comprises arresting the flow of milk and separating air therefrom at its locus of arrest and accumulation; continuously flowing the deaerated milk at a substantially regular rate from the locus of arrest and accumulation while it is flowing thereto at a variable rate; changing the temperature of the milk in the course of its flow from the locus of arrest and accumulation; maintaining a milk seal adapted to prevent flow of air through the locus of temperature change; collecting the continuously flowing temperature-changed milk; maintaining a substantial vacuum at the locus of milk collection; withdrawing air and any milk entrained therein from the locus of arrest and accumulation, during said variable inflow to and regular outflow from the source of arrest and accumulation, in a path separate from the path of cooling, to the locus of milk collection and thereat depositing milk vapor, whereby the milk is continuously and uniformly cooled and deaerated without substantial loss of milk vapor.

4. A milking installation for continuously treating milk to effect a uniform change in its temperature while the milk is flowing at a variable rate from a source of supply, which comprises a milk pipe leading from said source of supply, a milk-arresting and air-separating vessel adapted to receive milk from the milk pipe, a temperature changer separate from and independent of said vessel and adapted to receive milk therefrom and to be sealed by the milk against flow therethrough of air and through which milk from said vessel is adapted to flow while milk is being supplied to the vessel, a milk receiver adapted to receive and hold the milk flowing from the temperature changer, a pipe communicating with said milk receiver and adapted for connection with a source of low pressure, and an air and milk vapor escape pipe connecting said vessel with the milk receiver independent of the temperature changer and otherwise disconnected from said source of low pressure and through which both air and milk vapor are withdrawn to the milk receiver, the milk vapor being there deposited while the air is removed through said low pressure pipe.

CYRUS HOWARD HAPGOOD.